United States Patent
Uchino et al.

(10) Patent No.: US 6,599,856 B1
(45) Date of Patent: Jul. 29, 2003

(54) FORMED ACTIVATED CARBON AND PROCESS FOR PRODUCING THE SAME

(75) Inventors: Masashi Uchino, Saitama (JP); Eiji Yamada, Saitama (JP); Hiroshi Yamashita, Tokyo (JP); Kazushi Matsuura, Tokyo (JP); Yoshitaka Takeda, Kanagawa (JP); Mitsuo Suzuki, Kanagawa (JP)

(73) Assignees: Tennex Corporation, Tokyo (JP); Mitsubishi Chemical Corporation, Tokyo (JP)

( * ) Notice: Subject to any disclaimer, the term of this patent is extended or adjusted under 35 U.S.C. 154(b) by 134 days.

(21) Appl. No.: 09/692,212

(22) Filed: Oct. 20, 2000

(30) Foreign Application Priority Data

Oct. 21, 1999 (JP) .......................................... P.11-299944
Mar. 10, 2000 (JP) ....................................... P.2000-066762

(51) Int. Cl.[7] .......................... B01J 21/18; B01J 23/02; B01J 20/02; C01B 15/12; D01F 9/12
(52) U.S. Cl. ..................... 502/180; 502/182; 502/183; 502/202; 502/208; 502/417; 502/423; 502/425; 502/427; 423/282; 423/299; 423/447.5; 423/460
(58) Field of Search ................................ 502/180, 182, 502/183, 202, 208, 416, 417, 423, 425, 427; 423/282, 299, 447.5, 460; 428/632–634, 402, 304, 315.5, 315.7, 317.1, 317.7, 317.9

(56) References Cited

U.S. PATENT DOCUMENTS

| | | | |
|---|---|---|---|
| 4,059,544 A | * 11/1977 | Yamaguchi et al. | 252/471 |
| 4,677,086 A | 6/1987 | McCue et al. | 502/62 |
| 4,869,739 A | 9/1989 | Kanome et al. | 55/269 |
| 4,963,519 A | 10/1990 | Okabayashi et al. | 502/63 |
| 5,202,302 A | * 4/1993 | De La Pena et al. | 502/425 |
| 5,324,703 A | 6/1994 | McCue et al. | 502/424 |
| 5,376,609 A | * 12/1994 | Guile | 502/62 |
| 5,599,384 A | * 2/1997 | Yoshida et al. | 96/143 |
| 5,691,270 A | 11/1997 | Miller | 502/416 |
| 5,914,294 A | * 6/1999 | Park et al. | 502/417 |
| 5,972,525 A | * 10/1999 | Mori et al. | 428/632 |
| 6,187,713 B1 | * 2/2001 | Gadkaree | 502/425 |
| 6,277,780 B1 | * 8/2001 | Beckler et al. | 502/180 |

FOREIGN PATENT DOCUMENTS

| | | |
|---|---|---|
| JP | 45-12565 | 5/1970 |
| JP | 52-13517 | 4/1977 |
| JP | 55-43402 | 11/1980 |
| JP | 56-37164 | 9/1981 |
| JP | 62-38468 | 3/1987 |
| JP | 63-246462 | 10/1988 |
| JP | 64-36961 | 2/1989 |
| JP | 3-193616 | * 8/1991 |
| JP | 4-154611 | * 5/1992 |
| JP | 8-4605 | 1/1996 |
| JP | 9-112356 | 4/1997 |
| JP | 10-339218 | 12/1998 |

OTHER PUBLICATIONS

Chemical Abstracts, vol. 86, No. 16, 1 page, AN 86:108665k, JP 51–037091, Apr. 18, 1977.

* cited by examiner

*Primary Examiner*—Mark L. Bell
*Assistant Examiner*—Patricia L. Hailey

(57) ABSTRACT

A formed activated carbon has a Kiya crushing strength of 1 kg or more and a specific heat of 0.4 J/K·cc or more at 25° C.

30 Claims, No Drawings

FORMED ACTIVATED CARBON AND PROCESS FOR PRODUCING THE SAME

FIELD OF THE INVENTION

This invention relates to formed activated carbon and process for producing the same. More particularly it relates to formed activated carbon for a fuel vapor collecting device, what is called "canister", and a process for producing the same.

BACKGROUND ART

An evaporative control system having a fuel vapor collecting device using activated carbon for preventing fuel vapor from dissipating in the air is known. This system is designed to have fuel vapor generated from a fuel system, such as a fuel tank, once adsorbed onto activated carbon of the fuel vapor collecting device and, when the engine is driven to introduce the air, the fuel vapor collecting device is purged with the air to desorb the fuel vapor, which is burnt in the engine.

The activated carbon exhibits higher adsorptivity for fuel vapor at a lower temperature, and higher desorptivity at a higher temperature. Adsorption of fuel vapor is an exothermic reaction, while desorption is an endothermic reaction. Therefore, with the progress of adsorption, the temperature of activated carbon elevates to gradually reduce the adsorptivity. Similarly, the temperature of activated carbon drops to reduce the desorptivity with the progress of desorption.

To solve this problem, JP-A-55-149622 proposes providing an activated carbon chamber with fin(s) for heat release to efficiently dissipate the generated heat thereby preventing temperature rise in adsorption or temperature drop in desorption to improve the adsorption and desorption efficiency.

JP-A-64-36962 proposes a fuel vapor collecting device packed with a collecting material comprising activated carbon having dispersed therein a heat accumulating solid filler having a higher specific heat than activated carbon. The fuel vapor collecting device is prepared by kneading coal powder and a heat accumulating solid filler together with a binder, forming, grinding, carbonizing, and activating.

According to JP-A-64-36962, however, since the heat accumulating solid filler is dispersed in activated carbon, the formed activated carbon hardly manifests a sufficiently increased specific heat, fails to have sufficient mechanical strength, and is still unsatisfactory in adsorptivity and desorptivity.

In the practice a treatment for increasing the bulk density is required for obtaining increased adsorptivity per unit volume. An activation treatment following forming has difficulty in securing sufficient mechanical strength or density consistently with high adsorptivity. A method comprising, forming with an organic binder after activation (see JP-B-56-37164, JP-B-55-43402, and JP-B-52-13517) and a method comprising forming with an inorganic binder (see JP-B-45-12565 and JP-B-63-242343) have been proposed but are still insufficient in securing high adsorptivity and desorptivity.

SUMMARY OF THE INVENTION

Under these circumstances, activated carbon having moderate strength and enhanced adsorptivity and desorptivity has been sought. An object of the present invention is to provide activated carbon meeting such a demand.

The present inventors have conducted extensive studies to improve adsorptivity and desorptivity of activated carbon while retaining heat resistance, strength, and density. As a result, they have found that formed activated carbon which has sufficient forming strength and can take full advantage of the high specific heat of a heat accumulating solid filler can be obtained by kneading, forming and firing a mixture of activated carbon powder, a heat accumulating solid filler whose particle size is relatively close to that of the activated carbon powder, clay, and specific compounds.

The present invention provides formed activated carbon having a Kiya crushing strength (hereinafter defined) of 1 kg or more and a specific heat of 0.4 J/k·cc or more at 25° C.

The present invention also provides a process of producing formed activated carbon comprising kneading 100 parts by weight of activated carbon powder with (A) 10 to 100 parts by weight of clay, (B) 5 to 200 parts by weight of a metal powder and/or a metal oxide powder, and (C) 2 to 20 parts by weight of a boron compound and/or a phosphorus compound, forming the mixture (plastic body), and firing the green body.

The present invention further provides formed activated carbon produced by the above process.

In preferred embodiments of the invention, the Kiya crushing strength is that of formed activated carbon having a diameter of 2.5 mm and a length of 4 mm; the metal powder is aluminum powder and/or magnesium powder; the metal oxide powder is alumina powder and/or magnesium oxide powder; the boron compound is boric acid and/or diboron trioxide ($B_2O_3$); the formed activated carbon has an average particle size of 0.5 to 5 mm; the firing temperature is 500 to 900° C.; and/or the formed activated carbon is for a fuel vapor collecting device.

The activated carbon powder which can be used in the invention includes various species obtained from coal, coconut shell, wood, lignin, etc. by activation with steam or chemicals, such as phosphoric acid, zinc chloride or an alkali metal. Phosphoric acid-activated wood-based carbon powder is preferred. From the standpoint of forming performance and formed body strength, the activated carbon powder usually has a particle size of 0.5 mm or smaller, preferably 0.05 to 0.15 mm. It is preferred for the activated carbon powder to comprise 200-mesh undersize particles in a proportion of 60 to 95%, particularly 60% or more of 100-mesh undersize particles and not more than 50% of 325-mesh undersize particles. It is still preferred that the activated carbon powder comprises 80% or more of 100-mesh undersize particles and not more than 40% of 325-mesh undersize particles, particularly 80 to 90% of 100-mesh undersize particles and 20 to 40% of 325-mesh undersize particles.

The activated carbon powder for use in the invention usually has a specific surface area of 500 to 2500 $m^2/g$, preferably 1000 to 2000 $m^2/g$, still preferably 1500 to 2000 $m^2/g$. Activated carbon having too small a specific surface area tends to have insufficient adsorptivity, while one having too large a specific surface area tends to have insufficient strength.

The clay which can be used in the invention preferably includes bentonite, such as sodium bentonite and calcium bentonite, with sodium bentonite being particularly preferred. Sodium bentonite, having a particle size ranging from 1 to 100 µm, is not allowed to enter and clog the smaller pores than 300 Å of activated carbon which participate in gas or liquid adsorption and therefore secures high adsorptivity of activated carbon.

The heat accumulating solid filler which can be used in the invention includes powders of metals, such as iron, aluminum, magnesium, copper and lead (or alloys thereof), oxides or carbonates of one or more of these metals, ceramics, or glass. Preferred of them are powders of metals or metal oxides.

In order to suppress the temperature fall of activated carbon while purging fuel vapor from the activated carbon, it is desirable for the heat accumulating solid filler to have a higher specific heat than activated carbon. Such heat accumulating solid fillers include metal powders, e.g., aluminum powder, aluminum alloy powder, and magnesium powder; metal oxide powders, e.g., alumina powder, magnesium oxide powder, and boron oxide powder; and metal carbonate powders, e.g, calcium carbonate powder and magnesium carbonate powder. Preferred of them are aluminum powder, alumina powder, and magnesium oxide powder. These metal powders, metal oxide powders and metal carbonate powders can be used either individually or as a mixture of two or more thereof. Metal oxide powders are preferred for their chemical stability. From this viewpoint, alumina powder and magnesium oxide powder are the most preferred.

Alumina species of alumina powder includes α-alumina, β-alumina, γ-alumina, δ-alumina, χ-alumina, η-alumina, θ-alumina, and κ-alumina, with α-alumina being preferred.

The heat accumulating solid filler for use in the invention usually comprises about 95% of 60-mesh undersize particles and preferably has a particle size in the range of from 50 to 300 $\mu$m, particularly from 50 to 150 $\mu$m. Too large or too small a particle size of the heat accumulating solid filler tends to impair forming performance only to produce a formed body with a low strength or density, which is hard to handle. It is desirable that the particle size of the heat accumulating solid filler be relatively close to that of the activated carbon powder, for example, be within 0.1 to 10 times, particularly 0.5 to 3 times, the particle size of the activated carbon.

The boron compound which can be used in the present invention includes boranes, such as borane and diborane; acids, such as boric acids, borinic acid, and boronic acid; esters of these acids; organic boron compounds, such as boroxine and borazine derivatives having the hydrogen atoms displaced with an alkyl group having 1 to about 20 carbon atoms or an aryl group having 6 to about 20 carbon atoms; carboran; and diboron trioxide ($B_2O_3$). Preferred of them are boric acids and $B_2O_3$. Boric acids are still preferred. Of boric acids, which include orthoboric acid, metaboric acid, and tetraboric acid, orthoboric acid is preferred. The boron compound is preferably used as ground to have such a particle size distribution comprising about 95% of 100-mesh undersize particles.

The phosphorus compound which can be used in the invention includes phosphoric acids (orthophosphoric acid and polyphosphoric acids) and phosphoric acid salts, such as sodium phosphate, calcium phosphate and triphosphates, with phosphoric acids being preferred.

The boron compound and the phosphorus compound have an action of decreasing the temperature at which the clay changes its crystal form in firing the green body. That is, they are effective in lowering the firing temperature and developing the strength of formed activated carbon thereby to suppress contraction of pores due to the thermal history of the matrix activated carbon. It is believed therefore that these compounds contribute to a good balance between adsorptivity and strength.

The formed activated carbon according to the invention can be obtained from 100 parts by weight of the activated carbon powder compounded with 10 to 100 parts by weight, preferably 40 to 80 parts by weight, of the clay, 5 to 200 parts by weight, preferably 50 to 150 parts by weight, still preferably 100 to 150 parts by weight, of the heat accumulating solid filler, and 2 to 20 parts by weight, preferably 5 to 10 parts by weight, of the boron compound and/or the phosphorus compound. For example, the activated carbon powder, the clay, the heat accumulating solid filler, and the boron compound are mixed at a ratio of 10:6:10:1 by weight. Too much clay reduces adsorptivity, and too little clay reduces forming performance and strength. Use of too large an amount of the heat accumulating solid filler results in reduction in forming performance and strength of formed carbon. When used in too small an amount, the heat accumulating solid filler produces small effects on improvement of adsorptivity and desorptivity. The boron compound and/or the phosphorus compound, when used in too large an amount, reduces adsorptivity and desorptivity. If the amount is too small, the strength of formed carbon reduces.

The formed activated carbon of the invention can be obtained by kneading the above-described components together with an adequate amount of a plasticizer, such as water, forming the mixture, and firing the resulting green body. Kneading is usually conducted by means of a mixing machine, such as a kneader, at ambient temperature until the mixture develops such plasticity that the body may be held with hands. The amount of water to be added is such that the body may be held with hands, usually 50 to 200 parts by weight, preferably 100 to 150 parts by weight, per 100 parts by weight of the activated carbon powder.

The resulting plastic body is formed by an appropriate forming machine, e.g., an extruder or a press into granules of desired shape, such as a cylindrical shape or a spherical shape. Preferably, the plastic body is granulated by extrusion. If desired, the granules are ground by means of an appropriate grinder and sized within a desired particle size range.

The granules or grinds are fired in an oxygen-free atmosphere at 400 to 1000° C., preferably 500 to 900° C., to obtain formed activated carbon of the invention.

It is preferable that the granules be subjected to rolling treatment with a rolling apparatus, such as a tumbler tester, before firing to make the surface smooth and thereby to increase the bulk density. The rolling treatment is usually performed at about 30 to 300 rpm, preferably about 50 to 100 rpm, for about 10 minutes to 10 hours, preferably about 30 minutes to 3 hours.

If desired, the firing treatment may be preceded or followed by washing or drying. Washing is carried out with a washing liquid giving no influence on the adsorption performance, usually deionized water or tap water, for several tens of seconds to several hours, preferably about 10 minutes to 1 hour. The washing system is heated appropriately, usually at 30 to 100° C., or boiled. Drying is conducted usually at about 50 to 200° C., preferably about 100 to 150° C., for about 0.5 to 50 hours, preferably about 1 to 10 hours.

The formed activated carbon according to the invention has a Kiya crushing strength of 1 kg or more, preferably 1 to 15 kg. The Kiya crushing strength is typically measured on a cylindrically formed activated carbon granule having a diameter of 2.5 mm and a length of 4 mm. The formed activated carbon of the invention is suited for use in a canister of automobiles. For this use, the formed activated carbon preferably has a Kiya crushing strength of 3 kg or more. Formed activated carbon having too small a Kiya crushing strength is readily powderized while being packed or used to have an increased permeation resistance (pressure loss).

The terminology "Kiya crushing strength" as used herein means a hardness measured as follows. A sample is placed on a mount and pressed down by a cylinder with its base facing down under a slowly increasing load. The applied load and the resistance of the sample are monitored, and the load at which the resistance falls to zero (i.e., at the time when the sample is crushed to break the contact between the sample, and the base of the cylinder) is taken as a Kiya crushing strength. The measurement can easily be made with a commercially available Kiya type hardness tester. The Kiya crushing strength of the formed activated carbon according to the invention is 1 kg or more, preferably 3 to 15 kg, as measured on a granular sample of 2.5 mm in diameter and 4 mm in length.

The formed activated carbon of the invention desirably has a specific heat (25° C.) of 0.4 J/k·cc or more, particularly 0.5 J/k·cc or more, which is preferred for preventing a temperature elevation during fuel vapor adsorption and for suppressing a temperature fall during fuel vapor desorption. If the specific heat is too low, the effects of adsorption and desorption are insubstantial. Considering the limited specific heat of the heat accumulating solid filler incorporated, the upper limit of the specific heat of the formed activated carbon would be about 0.8 J/k·cc.

The specific heat (25° C.) can be measured in a usual manner. For example, it is obtained with a Perkin Elmer DSC7 equipped with Intracooler System using synthetic sapphire, etc. as a standard substance.

For use in canisters of automobiles, the formed activated carbon preferably has an average particle size of 0.5 to 5 mm, particularly 2 to 3 mm, and a length of about 0.5 to 10 mm, preferably about 3 to 5 mm. Too small particles increase permeation resistance, and too large particles have reduced packing density, leading to reduced performance.

Having the above-described physical properties, the formed activated carbon of the invention, as used at a packing density of 0.6 to 0.8 g/cc, exhibits such an ability of adsorbing and desorbing fuel vapor (e.g., gasoline vapor) as has a leak (second time) of about 0.009 to 0.012 g in a DBL test hereinafter described. It is therefore suitable for use as an adsorbent of a fuel vapor collecting device (canister) of an evaporative control system.

The present invention will now be illustrated in greater detail with reference to Examples, but it should be understood that the invention is not deemed to limited thereto. Measurements were made in Examples as follows. Unless otherwise noted, all the parts and percents are by weight.

1) DBL Test
   i. Gasoline vapor was passed through a canister filled with activated carbon until a breakthrough of 2 g, and the canister was then purged with a 400-fold amount of air.
   ii. The above operation was repeated 10 cycles. After 11th adsorption, the canister was allowed to stand at ambient temperature for 1 day (soaking).
   iii. After the canister was purged with a 400-filled amount of air, 50% butane was passed at a rate of 40 g/hr until a breakthrough of 2 g.
   iv. After the canister was purged under conditions in conformity with the kind of the automobile (with an about 300-fold amount of air) and soaked, the following diurnal test was carried out.
   v. The canister was connected to a gasoline tank, and a Tedlar bag for leak measurement was attached to the outlet of the canister.
   vi. The gasoline temperature was raised from 18° C. up to 41° C. over 12 hours, and the leak was measured (first leak).
   vii. The gasoline temperature was dropped from 41° C. to 18° C. over 12 hours. viii. The gasoline temperature was raised from 18° C. to 41° C. over 12 hours, and the leak was measured (second leak).
   ix. The leak was obtained from (concentration of the gas in the Tedlar bag)×(volume of the Tedlar bag).

2) n-Butane Adsorption 2-1)
   i. A glass column was packed with 20 ml of activated carbon and kept at 25° C.
   ii. 100% n-Butane was passed through the column at a rate of 105.4 ml/min for 20 minutes to measure a saturated adsorption.
   iii. Nitrogen gas was passed through the column at a rate of 200 ml/min for 20 minutes at 25° C. to measure a residual adsorption.
   iv. An effective adsorption was obtained from [(saturated adsorption)−(residual adsorption)].

2-2)
   i. A glass column was packed with 20 ml of activated carbon and kept at 25° C.
   ii. 100% n-Butane was passed through the column at a rate of 105.4 ml/min for 15 minutes to measured a saturated adsorption.
   iii. Nitrogen gas was passed through the column at a rate of 300 ml/min for 40 minutes at 25° C. to measure a residual adsorption.
   iv. An effective adsorption was obtained from [(saturated adsorption)−(residual adsorption)].

3) Specific Heat

A Perkin Elmer DSC7 equipped with Intracooler System was used. Synthetic sapphire (specific heat at 25° C.: 0.652 J·g·° C.) was used as a standard substance. A sample (several cylindrical granules of formed activated carbon laid sideways on a mount) was maintained at 0° C. for 5 minutes in a nitrogen atmosphere, heated at a rate of 10° C./min up to 50° C., at which it was maintained for 5 minutes, and the specific heat at 25° C. was measured.

4) Kiya Crushing Strength

Kiya crushing strength of 25 formed activated carbon granules having a length of 3 to 5 mm was measured with a Kiya type hardness tester, and an average was obtained.

EXAMPLE 1

Wood-based granular activated carbon (specific surface area: 1500 m$^2$/g) was ground in a sample mill to such a degree that about 90% of particles had a 100-mesh undersize.

The resulting activated carbon powder (100 parts) was mixed with 63 parts of sodium bentonite (specific heat: 0.75 J/k·g), 10 parts of boric acid powder (100-mesh undersize), and 108 parts of aluminum powder (100-mesh undersize (about 175 to 150 $\mu$m); specific heat (25° C.): 0.90 J/k·g) in a kneader for 15 minutes. To the mixture was added 125 parts of water, and kneading was continued for an additional 45 minute period.

The resulting plastic body was formed into cylinders having a diameter of about 2.5 mm and a length of about 4 mm by means of a disc pelleter, which were rolled in a tumbler tester at 50 rpm for 60 minutes.

The activated carbon pellets were dried in a hot-air drier at 115° C. for 6 hours and then fired in a rotary kiln in a nitrogen atmosphere at 650° C. for 1 hour. The fired carbon was boiled in 10 time as much deionized water as the carbon for 30 minutes to remove excess boric acid, followed by dewatering and drying at 115° C. for 6 hours. The physical properties and performance of the resulting formed activated carbon are shown in Table 1 below.

EXAMPLE 2

Formed activated carbon was prepared in the same manner as in Example 1, except for replacing the aluminum powder with 126 parts of α-alumina powder (particle size: 50 to 300 μm; average particle size: about 150 μm; specific heat (25° C.) 0.77 J/k·g). The physical properties and performance of the resulting formed activated carbon are shown in Table 1.

EXAMPLE 3

Formed activated carbon was prepared in the same manner as in Example 1, except for replacing the aluminum powder with 108 parts of α-alumina powder (particle size: 50 to 300 μm; average particle size: about 150 μm; specific heat (25° C.) 0.77 J/k·g). The physical properties and performance of the resulting formed activated carbon are shown in Table 1.

EXAMPLE 4

Formed activated carbon was prepared in the same manner as in Example 1, except for replacing the aluminum powder with 108 parts of magnesium oxide powder (particle size: about 50 to 150 μm; specific heat (25° C.): 0.94 J/k·g). The physical properties and performance of the resulting formed activated carbon are shown in Table 1.

Comparative Example 1

Formed activated carbon was prepared in the same manner as in Example 1, except for using no aluminum powder. The physical properties and performance of the resulting formed activated carbon are shown in Table 1.

Comparative Example 2

Formed activated carbon was prepared in the same manner as in Example 1, except for changing the amounts of sodium bentonite and boric acid powder to 129 parts and 20 parts, respectively. The physical properties and performance of the resulting formed activated carbon are shown in Table 1.

Comparative Example 3

Formed activated carbon was prepared in the same manner as in Example 1, except for changing the amounts of sodium bentonite and boric acid powder to 193 parts and 38 parts, respectively. The physical properties and performance of the resulting formed activated carbon are shown in Table 1.

Comparative Example 4

Physical properties and performance of commercially available wood-based formed activated carbon (diameter: 2.2 mm; containing none of clay, metal powder, metal oxide powder and a boron compound) are shown in Table 1.

TABLE 1

| | Diameter (mm) | Packing Density (g/cc) | Kiya Crushing Strength (kg) | n-Butane Adsorption* | | | | Leak in DBL Test (g) | | Specific Heat (J/k · g) | Specific Heat (J/k · cc) |
| | | | | Saturated (g/dl) | Residual (g/dl) | Effective (g/dl) | Desorptivity (%) | 1st | 2nd | | |
|---|---|---|---|---|---|---|---|---|---|---|---|
| Ex. 1 | 2.5 | 0.67 | 3 | 10.3 | 2.8 | 7.5 | 73 | 0.005 | 0.009 | 0.73 | 0.49 |
| Ex. 2 | 2.5 | 0.77 | 4 | 11.1 | 1.3 | 9.8 | 88 | 0.006 | 0.012 | 0.69 | 0.53 |
| Ex. 3 | 2.5 | 0.72 | 4 | 11.5 | 1.7 | 9.8 | 85 | 0.006 | 0.012 | 0.69 | 0.50 |
| Ex. 4 | | 0.68 | 3 | 10.4 | 1.5 | 8.9 | 86 | 0.004 | 0.011 | 0.74 | 0.50 |
| Comp. Ex. 1 | 2.5 | 0.51 | 7 | 13.0 | 4.1 | 8.9 | 68 | 0.009 | 0.016 | 0.71 | 0.36 |
| Comp. Ex. 2 | 2.5 | 0.61 | 10 | 11.0 | 3.7 | 7.3 | 66 | 0.012 | 0.023 | — | — |
| Comp. Ex. 3 | 2.5 | 0.66 | 13 | 8.5 | 3.1 | 5.4 | 64 | 0.016 | 0.033 | — | — |
| Comp. Ex. 4 | 2.2 | 0.34 | 3 | 12.6 | 3.8 | 8.8 | 70 | 0.007 | 0.017 | — | — |

*Method (2-1) was applied to Examples, and method (2-2) was applied to Comparative Examples.

The present invention provides activated carbon having moderate strength and improved adsorptivity and desorptivity and suited for use in canisters.

The entire disclosure of each and every foreign patent application from which the benefit of foreign priority has been claimed in the present application is incorporated herein by reference, as if fully set forth.

What is claimed is:

1. A formed activated carbon, comprising:
    a heat accumulating solid filler; and
    a clay;
    wherein said formed activated carbon has a Kiya crushing strength of 1 kg or more and a specific heat of 0.4 J/K·cc or more at 25° C.

2. The formed activated carbon according to claim 1, wherein the Kiya crushing strength is that of the formed activated carbon having a diameter of 2.5 mm and a length of 4 mm.

3. The formed activated carbon according to claim 1, which has a Kiya crushing strength of 1 to 15 kg in a formed activated carbon with a diameter of 2.5 mm and a length of 4 mm.

4. The formed activated carbon according to claim 1, which has a specific heat of 0.4 to 0.8 J/k·cc at 25° C.

5. The formed activated carbon according to claim 1, which has an average particle size of 0.5 to 5 mm.

6. The formed activated carbon according to claim 1, which is obtained by a process comprising:
    kneading 100 parts by weight of an activated carbon powder with
    (A) 10 to 100 parts by weight of clay,
    (B) 5 to 200 parts by weight of a heat accumulating solid filler, and (C) 2 to 20 parts by weight of a boron compound, a phosphorus compound or a mixture thereof, to prepare a plastic body;

forming said plastic body to prepare a green body; and firing said green body;

wherein each amount of (A), (B) and (C) is based on 100 parts by weight of activated carbon.

7. The formed activated carbon according to claim 6, wherein the heat accumulating solid filler has a higher specific heat than the activated carbon powder.

8. The formed activated carbon according to claim 6, wherein the heat accumulating solid filler is a metal powder, a metal oxide powder or a mixture thereof.

9. The formed activated carbon according to claim 8, wherein the metal powder is aluminum powder, magnesium powder or a mixture thereof.

10. The formed activated carbon according to claim 8, wherein the metal oxide powder is alumina powder, magnesium oxide powder or a mixture thereof.

11. The formed activated carbon according to claim 6, wherein the boron compound is boric acid, diboron trioxide ($B_2O_3$) or a mixture thereof.

12. The formed activated carbon according to claim 6, wherein the firing is at 500 to 900° C.

13. The formed activated carbon according to claim 6, wherein the heat accumulating solid filler is used in an amount of 100 to 150 parts by weight per 100 parts by weight of the activated carbon powder.

14. The formed activated carbon according to claim 1, wherein said heat accumulating solid filler is a metal powder, a metal oxide powder or a mixture thereof.

15. The formed activated carbon according to claim 14, wherein said metal powder is aluminum powder, magnesium powder or a mixture thereof.

16. The formed activated carbon according to claim 14, wherein said metal oxide powder is alumina powder, magnesium oxide powder or a mixture thereof.

17. The formed activated carbon according to claim 1, comprising 5 to 200 parts by weight of said heat accumulating solid filler per 100 parts by weight of an activated carbon powder.

18. The formed activated carbon according to claim 1, comprising 10 to 100 parts by weight of clay per 100 parts by weight of an activated carbon powder.

19. The formed activated carbon according to claim 1, wherein said heat accumulating filler has a higher specific heat than activated carbon.

20. A formed activated carbon obtained by a process comprising:

kneading 100 parts by weight of an activated carbon powder with (A) 10 to 100 parts by weight of clay, (B) 5 to 200 parts by weight of a metal powder, a metal oxide powder or a mixture thereof, and (C) 2 to 20 parts by weight of a boron compound, a phosphorus compound or a mixture thereof;

to prepare a plastic body;

forming said plastic body to prepare a green body; and firing said green body;

wherein each amount of (A), (B) and (C) is based on 100 parts by weight of activated carbon.

21. The formed activated carbon according to claim 20, wherein the metal powder and the metal oxide powder have a higher specific heat than the activated carbon powder.

22. The formed activated carbon according to claim 20, wherein the metal powder is aluminum powder, magnesium powder or a mixture thereof.

23. The formed activated carbon according to claim 20, wherein the metal oxide powder is alumina powder, magnesium oxide powder or a mixture thereof.

24. The formed activated carbon according to claim 20, wherein the boron compound is boric acid, diboron trioxide ($B_2O_3$) or a mixture thereof.

25. The formed activated carbon according to claim 20, which has an average particle size of 0.5 to 5 mm.

26. The formed activated carbon according to claim 20, wherein the firing is at 500 to 900° C.

27. The formed activated carbon according to claim 20, wherein the heat accumulating solid filler is used in an amount of 100 to 150 parts by weight per 100 parts by weight of the activated carbon powder.

28. A process for producing a formed activated carbon, which comprises:

kneading 100 parts by weight of an activated carbon powder with (A) 10 to 100 parts by weight of clay, (B) 5 to 200 parts by weight of a metal powder, a metal oxide powder or a mixture thereof, and (C) 2 to 20 parts by weight of a boron compound, a phosphorus compound or a mixture thereof, to prepare a plastic body;

forming the resulting plastic body to prepare a green body; and firing the green body;

wherein each amount of (A), (B) and (C) is based on 100 parts by weight of activated carbon.

29. The process for producing a formed activated carbon according to claim 28, wherein the firing is at 500 to 900° C.

30. The process for producing a formed activated carbon according to claim 28, wherein the green body is subjected to a rolling treatment, after the forming and before firing.

* * * * *